UNITED STATES PATENT OFFICE.

GEORGE HENRY RICHARDS, OF LONDON, ENGLAND.

NICOTIN SALICYLATE AND PROCESS OF MAKING SAME.

SPECIFICATION forming part of Letters Patent No. 685,061, dated October 22, 1901.

Original application filed April 8, 1901, Serial No. 54,793. Divided and this application filed July 31, 1901. Serial No. 70,421. (No specimens.)

*To all whom it may concern:*

Be it known that I, GEORGE HENRY RICHARDS, merchant, a subject of the King of Great Britain, residing at 128 Southwark street, in the county of London, England, have invented a compound for use in horticulture or agriculture for eradicating insect life or mildew and the process of manufacture of the said compound, (for which I have made application for patent in Great Britain, dated November 9, 1900, No. 20,194,) of which the following is a specification.

It has long been common, in order to eradicate insect life or mildew in horticulture or agriculture, to employ compositions or compounds containing nicotin as a principal or active factor, and the compounds have been brought into use by being subjected to heat, so as to become vaporized, the vapor being the medium by which the objects in view are attained. In the specification of a patent application made by myself and filed the 8th of April, 1901, Serial No. 54,793, I have pointed out that such compounds possess certain disadvantages in use. Thus the majority of such compounds are produced in fluid form and are non-crystallizable, and this fluid form renders them extremely inconvenient and wasteful in use, while it enlarges the difficulties of packing and transport. In other forms the nicotin has been mechanically mixed with some absorbent material, such as clay, lime, sandstone, or the like, and so made into a paste; but hitherto these so-called "solid" compounds have not proved satisfactory, in that they all leave a baked and hard residue after vaporization, which corrodes the receptacles in which vaporization takes place, rendering constant cleaning necessary, while not all the nicotin is evaporated and waste ensues.

Now in the specification of my patent application aforementioned, Serial No. 54,793, of 1901, I have described a new chemical compound composed of salicylic acid and nicotin, and I there give directions by which the salicylate of nicotin can be produced in the form of a solid salt and compressed into cakes for convenient packing, transport, and use, while upon this chemical compound being subjected to heat the whole becomes completely vaporized, leaving no residue, nor does it corrode the receptacles in which it is vaporized. I found that although the chemical compound I have described in the said specification, Serial No. 54,793, of 1901, is extremely effective and presents all the advantages I have there stated, yet it can be made to carry farther and its use economized by the addition of camphor, (gum-camphor,) while this addition to the solid salt also enables a firmer and stronger cake or tablet to be produced by pressure, which cake or tablet upon being placed into a dish or receiver and heat applied entirely melts and volatilizes, leaving no residue in the dish.

I am quite aware that it has been proposed to include a proportion of gum-camphor with sandstone and silicious earth in a mechanical mixture with nicotin; but this mixture does not possess the advantages of the specific compound which forms the subject-matter of this specification and claims.

In carrying out my invention I take about forty-two pounds of salicylic acid and fifty pounds of nicotin, preferably highly-purified nicotin, and I dissolve the acid in the nicotin by means of heat. The mixture is then set aside to crystallize, after which the mother-liquor is drained off, and the solid salt (the salicylate of nicotin) is dried and powdered, gum-camphor being added and mixed with the powdered salt in the proportion of about one part, by weight, of the gum-camphor to about two parts, by weight, of the solid powdered salt salicylate of nicotin. The compound is then compressed into cakes or tablets of convenient size and is ready for use.

What I claim as my invention, and desire to secure by Letters Patent, is—

1. As a new article of manufacture, a solid compound for use in horticulture or agriculture, for eradicating insect life and mildew, the said solid compound consisting of nicotin and salicylic acid forming a solid salt, with powdered gum-camphor added to the said salt, the mixture being compressed into the form of cakes or tablets which are capable of being entirely volatilized by heat, substantially as set forth.

2. The process for preparing the wholly-volatilizable solid compound for use in horticulture or agriculture for eradicating insect life or mildew, consisting of the combination with the nicotin and salicylic acid in the proportion of about forty-two pounds of salicylic acid to fifty pounds of nicotin, the acid being dissolved in the nicotin by the application of heat, allowed to crystallize, then drained and finally dried and powdered producing a solid salt *i. e.* salicylate of nicotin; of gum-camphor added to the aforesaid powdered solid salt in the proportion of about one part by weight of the camphor to two parts by weight of the salicylate of nicotin, the compound being then compressed into cakes or tablets, substantially as set forth.

GEORGE HENRY RICHARDS.

Witnesses:
D. M. STARK,
W. W. MARSHALL.